UNITED STATES PATENT OFFICE.

GEORGE H. BLAKE, OF PORTLAND, MAINE.

ARTIFICIAL STONE.

SPECIFICATION forming part of Letters Patent No. 460,195, dated September 29, 1891.

Application filed January 19, 1891. Serial No. 378,336. (No specimens.)

*To all whom it may concern:*

Be it known that I, GEORGE H. BLAKE, of Portland, in the county of Cumberland and State of Maine, have invented certain new and useful Improvements in Artificial Stone; and I do hereby declare that the following is a full, clear, and exact description of the invention, which will enable others skilled in the art to which it appertains to make and use the same.

My invention relates to improvements in artificial stone suitable for cornices, pilasters, friezes, urns, and similar articles. It may also be used for pavements and for roofing.

It consists of a combination of plumbaginous slate and silicate of soda, or of argillaceous slate, plumbago, and silicate of soda. It is formed by reducing the plumbaginous slate or the argillaceous slate and plumbago, as the case may be, to a fine powder and thoroughly mixing therewith silicate of soda sufficient to make the whole mass plastic, having about the consistency of dough, in which state it can be readily worked and molded into any desired shape. After the component parts have been thoroughly mixed into a homogeneous mass the hardening process goes on with great rapidity, and yet not so rapidly as to interfere with the convenient manipulation of it. By adding suitable coloring-matter before the mass begins to harden stone of different colors may be produced. In order that the color may be uniform throughout the whole mass, it is found convenient to mix the coloring-matter with the silicate of soda before the silicate of soda is mixed with the other ingredients. The result produced by this union of ingredients is an artificial stone exceedingly hard, tenacious, impervious to water, insoluble, and capable of receiving and retaining a very fine polish.

The special advantages of this stone consist in its cheapness, durability, the ease with which it is manufactured, the adaptability to be molded into any desired form, and the rapidity with which it becomes hard.

Having thus described my invention and its use, what I claim, and desire to secure by Letters Patent of the United States, is—

1. As a new composition of matter, an artificial stone composed of plumbaginous slate and an alkaline silicate, substantially as and for the purposes set forth.

2. As a new composition of matter, an artificial stone composed of plumbaginous slate and silicate of soda, substantially as and for the purposes set forth.

In testimony that I claim the foregoing as my own I affix my signature, in presence of two witnesses, this 3d day of December, A. D. 1890.

GEORGE H. BLAKE.

Witnesses:
ELGIN C. VERRILL,
NATHAN CLIFFORD.